United States Patent
Ohnaka et al.

(10) Patent No.: US 11,390,328 B2
(45) Date of Patent: Jul. 19, 2022

(54) VEHICLE BODY FRONT PART STRUCTURE

(71) Applicant: HONDA MOTOR CO., LTD., Tokyo (JP)

(72) Inventors: Ryo Ohnaka, Wako (JP); Shinobu Sagawa, Wako (JP); Tatsuya Suzuki, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/094,891

(22) Filed: Nov. 11, 2020

(65) Prior Publication Data
US 2021/0179183 A1   Jun. 17, 2021

(30) Foreign Application Priority Data
Dec. 11, 2019   (JP) .............................. JP2019-223921

(51) Int. Cl.
| | |
|---|---|
| *B62D 25/08* | (2006.01) |
| *B62D 25/04* | (2006.01) |
| *B62D 27/02* | (2006.01) |
| *B62D 21/15* | (2006.01) |

(52) U.S. Cl.
CPC ............ *B62D 25/08* (2013.01); *B62D 25/04* (2013.01); *B62D 27/023* (2013.01); *B62D 21/15* (2013.01)

(58) Field of Classification Search
USPC ..................... 296/203.01, 2, 187.09, 187.1
See application file for complete search history.

(56) References Cited

U.S. PATENT DOCUMENTS

| | | |
|---|---|---|
| 2016/0090126 A1 | 3/2016 | Min et al. |
| 2016/0159407 A1 | 6/2016 | Holmstrom et al. |

FOREIGN PATENT DOCUMENTS

| | | |
|---|---|---|
| JP | 2008-137552 | 6/2008 |
| JP | 2011-194903 | 10/2011 |
| JP | 4996707 | 8/2012 |
| JP | 2014-196066 | 10/2014 |

OTHER PUBLICATIONS

Japanese Notice of Allowance for Japanese Patent Application No. 2019-223921 dated Sep. 7, 2021.

*Primary Examiner* — Dennis H Pedder
(74) *Attorney, Agent, or Firm* — Amin, Turocy & Watson, LLP (57) ABSTRACT

A vehicle body front part structure includes a front pillar and an upper member. The upper member includes: a side wall on an outside in a vehicle width direction; and a stiffener that is joined to an inner surface of the side wall, that has a rear end part facing a front surface of the front pillar, and that forms a closed cross-section extending substantially in a vehicle body front-to-rear direction together with the side wall. The side wall of the upper member includes: a pillar fixation part that is arranged in a rearward extension area extending in a vehicle body rearward direction further than the rear end part of the stiffener and that is fixed to a side wall on an outside in the vehicle width direction of the front pillar; and a bead shape part that convexly projects outward in the vehicle width direction and that extends to a vicinity of the pillar fixation part from a frontward position further than the rear end part of the stiffener.

10 Claims, 11 Drawing Sheets

VEHICLE BODY FRONT PART STRUCTURE

CROSS-REFERENCE TO RELATED APPLICATION

Priority is claimed on Japanese Patent Application No. 2019-223921, filed on Dec. 11, 2019, the contents of which are incorporated herein by reference.

BACKGROUND

Field of the Invention

The present invention relates to a vehicle body front part structure.

Background

Most vehicles include an upper member that extends from a front pillar to a vehicle body front side. The front pillar forms a closed cross-section that extends in a vehicle body vertical direction, and the upper member forms a closed cross-section that extends in a vehicle body front-to-rear direction. When an impact load is input from a vehicle frontward direction to a position offset to a right or left of the vehicle, the upper member transmits the input load to a vehicle body rear part through the front pillar while being plastically deformed. In this case, it is essential to reliably transmit the input load to the front pillar side when a base of the upper member is plastically deformed to some degree. A vehicle body front part structure that is intended to achieve this has been proposed (refer to Japanese Patent No. 4996707).

In the vehicle body front part structure described in Japanese Patent No. 4996707, a reinforcement member is attached to an inside of the closed section of the upper member. A rear end part of the reinforcement member faces a front wall of the front pillar with a gap. When an impact load is input to the upper member from a vehicle body frontward direction, the upper member plastically deforms, and the rear end part of the reinforcement member comes into contact with the front wall of the front pillar when the upper member is plastically deformed to some degree. As a result, the impact load input to the upper member is transmitted to the front wall of the front pillar via the reinforcement member.

SUMMARY

However, the vehicle body front part structure described in Japanese Patent No. 4996707 has a structure in which a rear part of the upper member is simply joined to a front surface or a side surface in a vehicle width direction of the front pillar. Therefore, depending on an input position, angle, or the like of the impact load input from the vehicle body frontward direction, there is a concern that the upper member will fall outward in the vehicle width direction from a connection part of the rear part of the upper member connected to the front pillar as a starting point. In this case, a load transmission amount to the front pillar from the upper member is decreased due to the falling of the upper member, and it becomes difficult to increase an absorption amount of impact energy.

An aspect of the present invention provides a vehicle body front part structure capable of preventing an upper member from falling outward in a vehicle width direction when an impact load is input from a vehicle body frontward direction and efficiently transmitting the impact load from the upper member to a front pillar.

A vehicle body front part structure according to an aspect of the present invention includes: a front pillar that forms a closed cross-section extending in a vehicle body vertical direction; and an upper member that extends from the front pillar to a vehicle body frontward direction, wherein the upper member includes: a side wall on an outside in a vehicle width direction; and an stiffener that is joined to an inner surface of the side wall, that has a rear end part facing a front surface of the front pillar, and that forms a closed cross-section extending substantially in a vehicle body front-to-rear direction together with the side wall, and the side wall of the upper member includes: a pillar fixation part that is arranged in a rearward extension area extending in a vehicle body rearward direction further than the rear end part of the stiffener and that is fixed to a side wall on an outside in the vehicle width direction of the front pillar; and a bead shape part that convexly projects outward in the vehicle width direction and that extends to a vicinity of the pillar fixation part from a frontward position further than the rear end part of the stiffener.

In the configuration described above, when an impact load is input from a frontward direction of the upper member, a rear part of the upper member collapses and deforms, and the rear end part of the stiffener of the upper member comes into contact with a front wall of the front pillar. Thereby, the impact load input to the upper member is transmitted through the front pillar to the vehicle body rear. At this time, in the side wall of the upper member, the bead shape part that convexly projects outward in the vehicle width direction extends from a further frontward position than the rear end part of the stiffener to the vicinity of the pillar fixation part in the rearward extension area. Therefore, the rearward extension area of the side wall of the upper member does not easily fall and deform outward in the vehicle width direction. Accordingly, the upper member can efficiently transmit the impact load to the front pillar without falling outward in the vehicle width direction when the impact load is input from the vehicle body frontward direction.

Further, since the bead shape part of the side wall of the upper member convexly projects outward in the vehicle width direction, it is possible to enlarge a cross-sectional area of the closed cross-section formed of the upper member and the stiffener. Accordingly, the input load from the vehicle frontward direction can be stably transmitted to the front pillar side.

A circumference edge bend part that is bent outward in the vehicle width direction may be formed on a circumference edge portion of the pillar fixation part in the rearward extension area, and a ridge line on a root of the circumference edge bend part may continue to a ridge line on a root of the bead shape part.

In this case, since the ridge line on the root of the circumference edge bend part continues to the ridge line on the root of the bead shape part, it is possible to efficiently enhance a stiffness in the rearward extension area of the side wall from the bead shape part to the circumference edge portion of the pillar fixation part. Accordingly, in a case where the present configuration is employed, when an impact load is input to the upper member from the vehicle body frontward direction, it is possible to further prevent the falling deformation of the rearward extension area of the upper member, and it is possible to efficiently transmit the impact load to the vehicle body rearward direction through the rearward extension area of the upper member.

The bead shape part may have a vertical cross-section formed in a substantially trapezoidal shape, and a part of the bead shape part that is a top surface of the trapezoidal shape may be a flat surface.

In this case, the part of the bead shape part that becomes the top surface of the trapezoidal shape is a flat surface, and thereby, a ridge line is formed not only on the root of the bead shape part but also on a part corresponding to the top of the trapezoidal shape.

Therefore, the impact load input to the upper member from the vehicle body frontward direction can be further efficiently transmitted to the vehicle body rearward direction.

A ridge line may be formed on each of root positions of an upper side portion and a lower side portion of the bead shape part, and a spacing between the ridge lines of the upper side portion and the lower side portion may be increased toward a rearward direction from a frontward direction in a vehicle body front-to-rear direction.

In this case, the load input to the bead shape part of the upper member from the vehicle body frontward direction is easily distributed and transmitted to a wide range in a vertical direction of the front pillar.

The front pillar may have an inner portion of the closed cross-section that extends in a vehicle body vertical direction to which a bulk head that extends in a direction intersecting an extension direction of the closed cross-section is joined, and the bulk head may be arranged at a position that intersects the ridge line on the root of the circumference edge bend part in the rearward extension area.

In this case, the impact load transmitted to the rearward extension area of the upper member from the vehicle body frontward direction is efficiently transmitted to a reinforcement portion by the bulk head of the front pillar. Accordingly, when the present configuration is employed, the impact load transmitted to the rearward extension area of the upper member can be further efficiently transmitted to the vehicle body rearward direction.

The bulk head may include a connection flange joined to the sidewall of the front pillar, and a connection part of the connection flange may be arranged at a position at substantially the same height as a fixed part of the front pillar to which the pillar fixation part is fixed.

In this case, the impact load transmitted to the rearward extension area of the upper member from the vehicle body frontward direction is efficiently transmitted to the fixed part of the front pillar from the pillar fixation part of the rearward extension area at substantially the same height as the direct reinforcement part by the connection flange of the bulk head. When the present configuration is employed, the impact load transmitted to the rearward extension area of the upper member can be further efficiently transmitted to the front pillar at a height position where the stiffness is enhanced by the bulk head.

The bulk head may be arranged at a vertical position aligned in the vehicle body front-to-rear direction with a lower wall of a rear part of the upper member.

In this case, the load transmitted from the vehicle body frontward direction to the lower wall on the rear part of the upper member can be stably supported by the bulk head inside the front pillar.

The upper member may include an upper member inner part and an upper member outer part that are joined together in a vertical direction and that form a closed cross-section extending in a vehicle body front-to-rear direction, the upper member inner part and the upper member outer part may include an inner upper flange and an outer upper flange that stand upward and that are joined together, the inner upper flange and the outer upper flange may include a tilt area in which a standing position changes from an inside to an outside in a vehicle width direction toward a vehicle body rearward direction from a vehicle body frontward direction, and the stiffener may include a joint piece that is provided between the tilt areas of the inner upper flange and the outer upper flange and that is joined to the inner upper flange and the outer upper flange.

In this case, when an impact load input from a vehicle body frontward direction to a front part of the upper member is transmitted through outer corner portions of the upper member inner part and the upper member outer part to the tilt areas of the inner upper flange and the outer upper flange, the impact load is efficiently transmitted to an upper wall of the upper member inner part via the joint piece of the stiffener provided between the tilt areas of the inner upper flange and the outer upper flange. Therefore, it is possible to reduce the load transmitted to the pillar fixation part at the rear part of the side wall on the outside in the vehicle width direction of the upper member. Accordingly, when the present configuration is employed, it is possible to further prevent the upper member from falling outward in the vehicle width direction when the impact load is input from the vehicle body frontward direction.

The inner upper flange and the outer upper flange may have a rear extension region that is arranged at a rear end of the tilt area and that extends via a bend part to a vehicle body rearward direction, and the joint piece of the stiffener may be joined to the tilt area and the rear extension region so as to interpose the bend part.

In this case, an impact load transmitted from a vehicle frontward direction to the tilt area of the outer upper flange is also efficiently transmitted to a rear tilt area and the bend part of the inner upper flange via the joint piece of the stiffener. Accordingly, when the present configuration is employed, it is possible to increase the load transmitted to the upper wall of the upper member inner part.

The front pillar may include a pillar inner part and a pillar outer part that are joined together and that form the closed cross-section extending in the vehicle body vertical direction, the upper member inner part may include a side wall on an inside in the vehicle width direction and an upper wall that is bent outward in the vehicle width direction from an upper part of the side wall and that is connected to the inner upper flange, the pillar inner part may include a front extension part extending in a vehicle body frontward direction further than the pillar outer part from a joint part on a vehicle body frontward side with the pillar outer part, and a rear part of the side wall on the inside in the vehicle width direction of the upper member inner part may be joined to the front extension part of the pillar inner part.

In this case, an impact load transmitted from a vehicle frontward direction to the side wall on the inside in the vehicle width direction of the upper member inner part is transmitted to the closed cross-section of the front pillar via the front extension part of the pillar inner part. Accordingly, in a case where the present configuration is employed, the impact load that is input from the vehicle body frontward direction to the upper member can be transmitted to the front pillar through a wide area of the rear part of the upper member.

The upper wall of the upper member inner part and the inner upper flange of the upper member inner part may be joined to a front wall of the pillar outer part via a patch member, the patch member may include a patch upper wall joined to the upper wall of the upper member inner part and a patch flange joined to the inner upper flange of the upper member inner part, and a bend ridge line between the patch flange and the patch upper wall of the patch member may continue in the vehicle body front-to-rear direction to a bend ridge line between the inner upper flange and the upper wall of the upper member inner part.

In this case, an impact load transmitted from a vehicle frontward direction to the inner upper flange or the upper wall of the upper member inner part is efficiently transmitted to the front wall of the pillar outer part through the bend ridge line of the patch member and the bend ridge line of the upper member inner part. Accordingly, in a case where the present configuration is employed, it is possible to further prevent the upper member from falling outward in the vehicle width direction when an impact load is input.

According to the aspect of the present invention, by the bead shape part formed on the side wall of the upper member, an impact load input to the upper member from a vehicle body frontward direction can be efficiently transmitted to the front pillar via the stiffener while preventing the upper member from falling outward in the vehicle width direction.

DESCRIPTION OF EMBODIMENTS

Hereinafter, an embodiment of the present invention will be described with reference to the drawings. In a suitable position in the drawing, an arrow FR pointing to a frontward direction of a vehicle 1, an arrow UP pointing to an upward direction of the vehicle 1, and an arrow LH pointing to a leftward direction of the vehicle 1 are shown. In the following description, right and left directions mean right and left directions toward the frontward direction of the vehicle.

Figure 1:
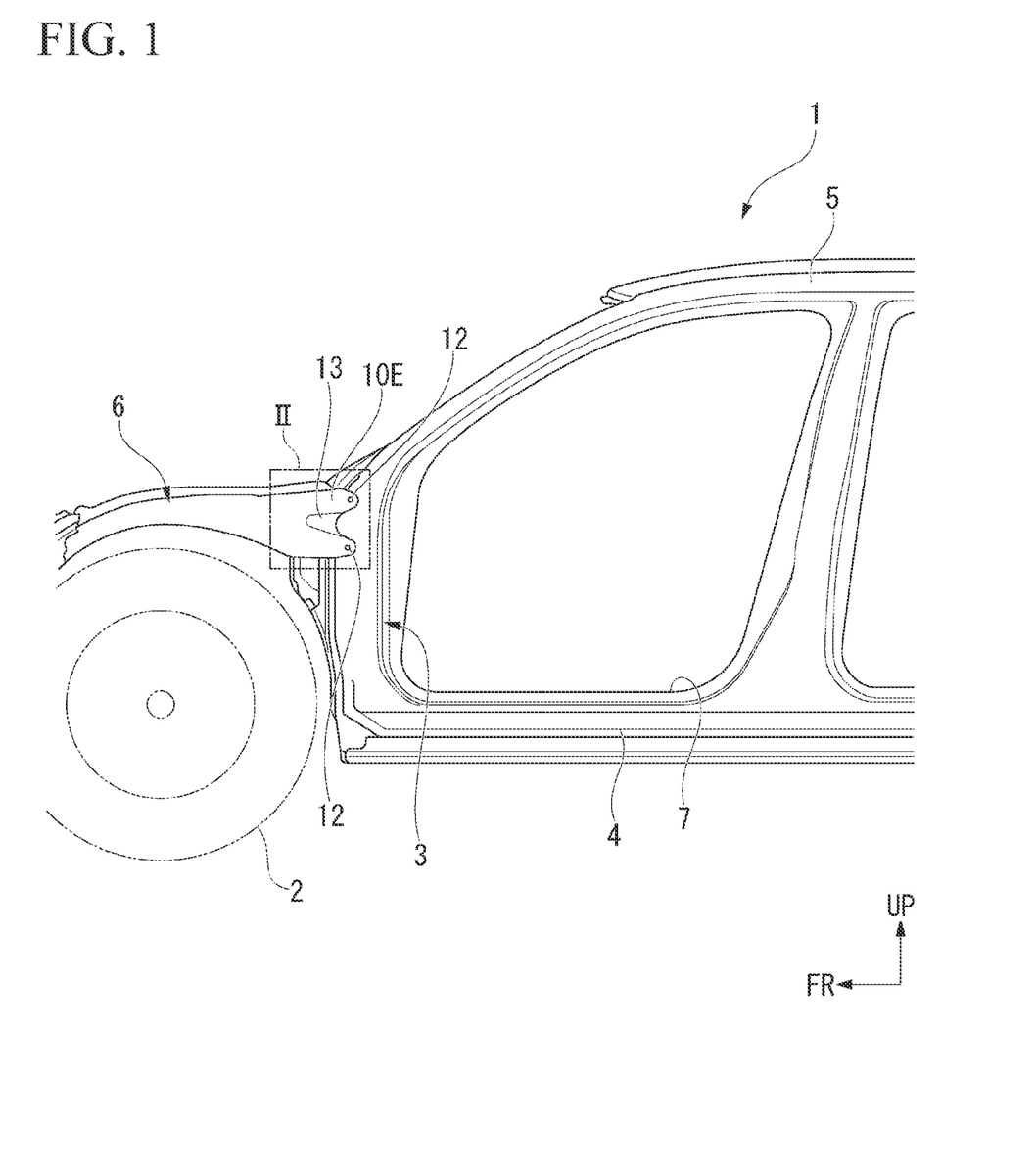
FIG. 1 is a side view of a vehicle according to an embodiment.

FIG. 1 is a left side view of a skeleton part of the vehicle 1 according to an embodiment.

In the vehicle 1, a front pillar 3 is arranged at a rearward position of right and left front wheels 2, and a side sill 4 is arranged at a lower position on an outside in a vehicle width direction of a vehicle room. The front pillar 3 extends in a vehicle body upward direction from a front end part of the side sill 4. An upper part of the front pillar 3 is inclined toward a vehicle body upward rearward direction and is connected to a front end part of a roof side rail 5.

The front pillar 3 constitutes a front area of a door opening 7 on a vehicle body side part. The front pillar 3 constitutes a closed cross-section having a substantially rectangular shape extending in a vehicle body upward and downward direction.

An upper member 6 extends in a vehicle frontward direction from a substantially intermediate position in an upward and downward direction of the front pillar 3. The upper member 6 is arranged at an upward position and an outside in a vehicle width direction of a front side frame (not shown). The upper member 6 constitutes a closed cross-section having a substantially rectangular shape extending in a vehicle body front-to-rear direction. A lower member (not shown) that constitutes a closed cross-section having a substantially rectangular shape is connected to a front end part of the upper member 6 so as to continue to the upper member 6.

Figure 2:
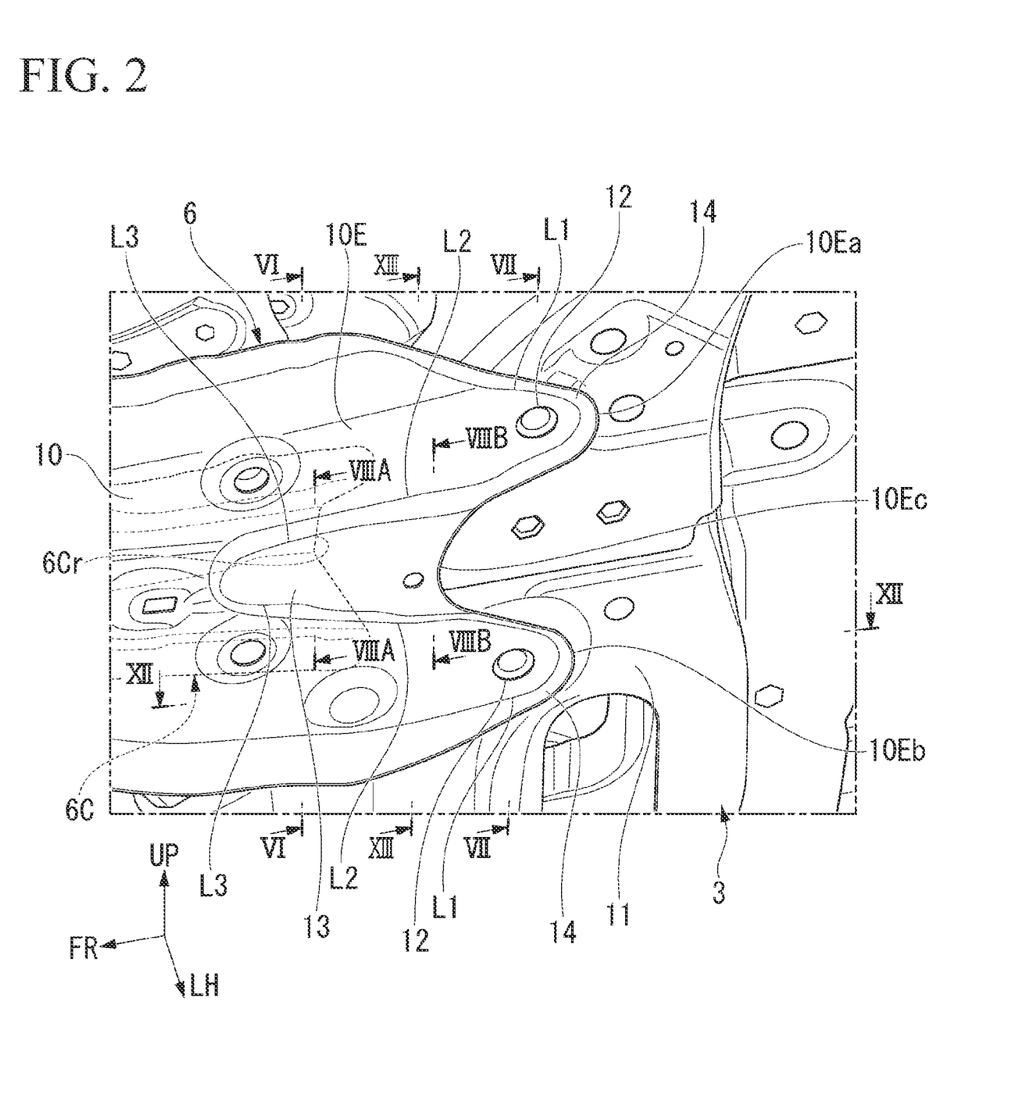
FIG. 2 is a perspective view of a part corresponding to a portion II of FIG. 1 of the vehicle according to the embodiment.
Figure 3:
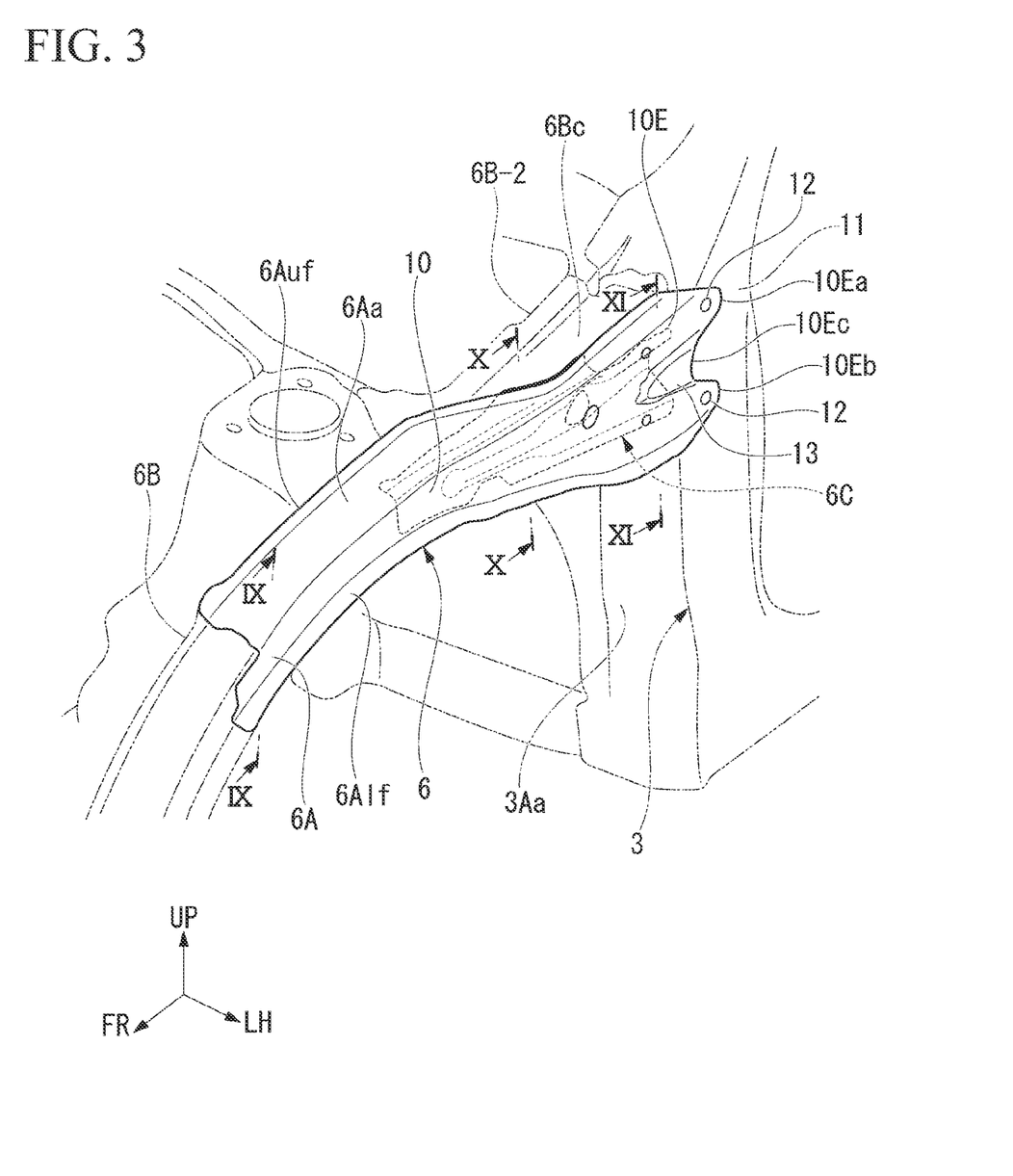
FIG. 3 is a perspective view of a left front upper part of the vehicle according to the embodiment.
Figure 4:
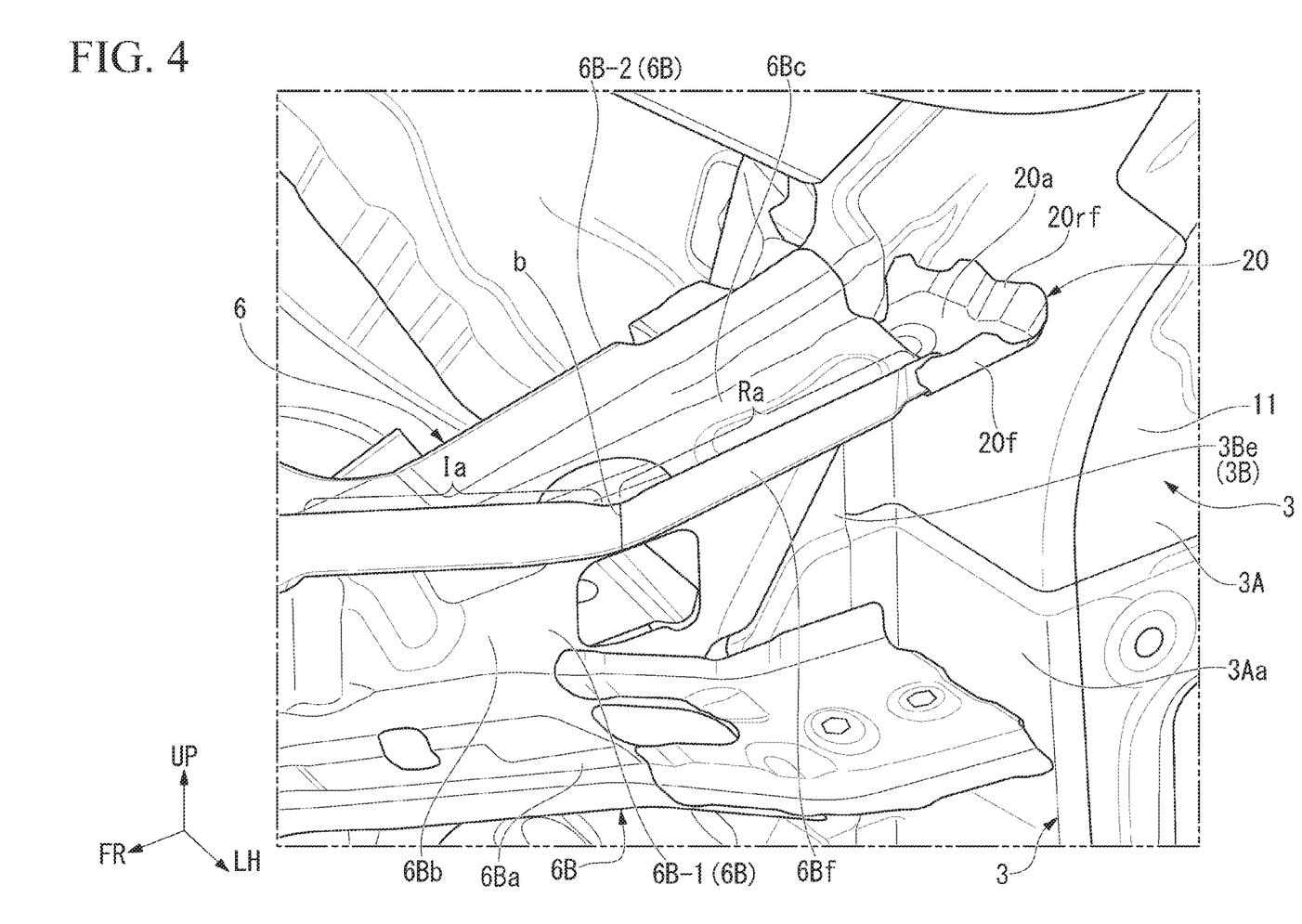
FIG. 4 is a perspective view of the left front upper part of the vehicle from which some of the components are removed according to the embodiment.
Figure 5:
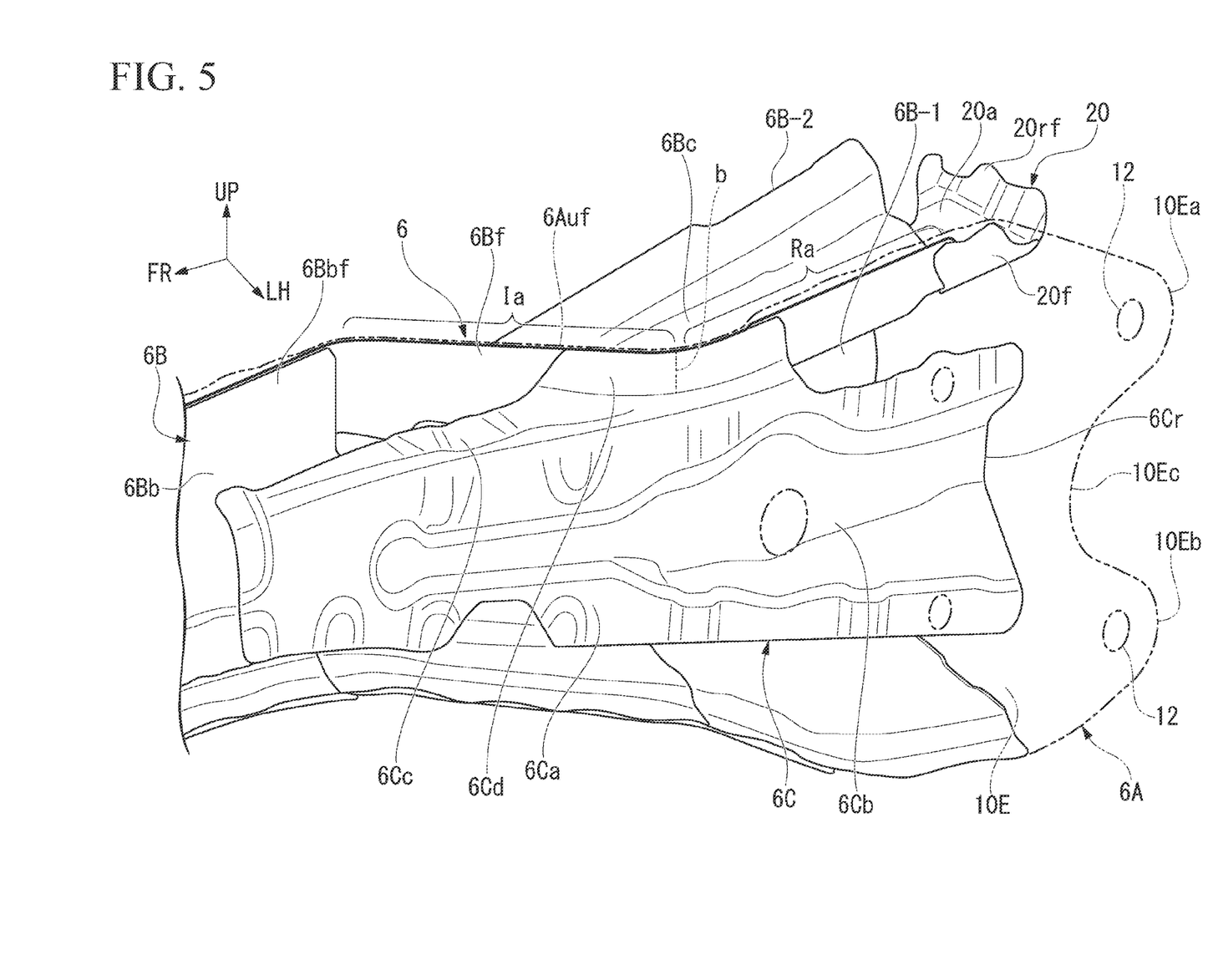
FIG. 5 is a perspective view of an upper member according to the embodiment.
Figure 6:
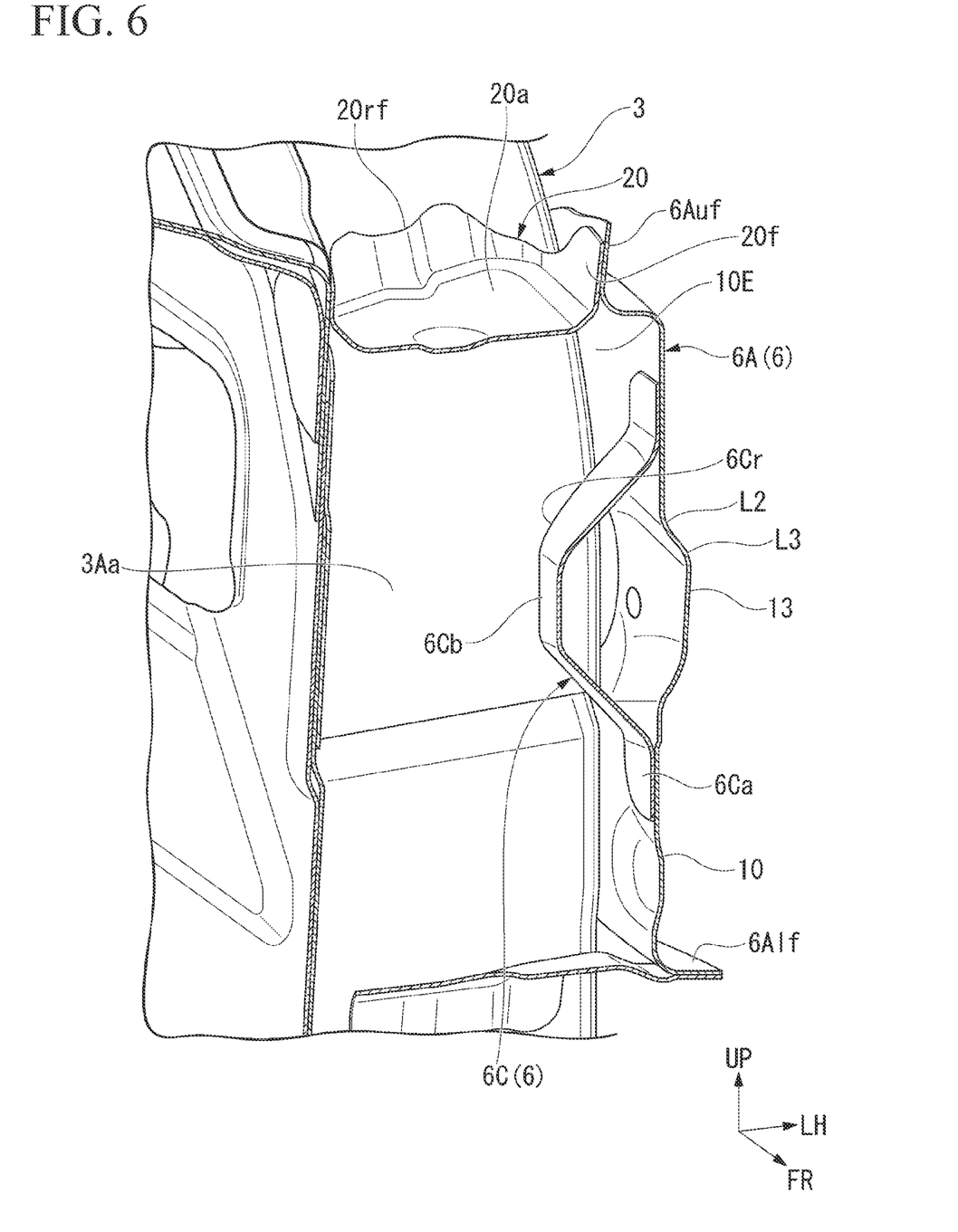
FIG. 6 is a partial cross-sectional perspective view of the vehicle in which a part corresponding to a VI-VI cross-section of FIG. 2 is sectioned.

FIG. 2 is a perspective view of a part corresponding to a portion II of FIG. 1. FIG. 3 is a perspective view of a left upper part of the vehicle 1 in which only some (upper member outer part 6A) of the members is indicated by a solid line and other members are indicated by a virtual line. FIG. 4 is a perspective view of the left upper part of the vehicle from which some (upper member outer part 6A) of the members is removed. FIG. 5 is a perspective view of the upper member 6 in which some (upper member outer part 6A) of the members is indicated by a virtual line, and FIG. 6 is a partial cross-sectional perspective view of the vehicle in which a part corresponding to a VI-VI cross-section of FIG. 2 is sectioned.

The upper member 6 includes: an upper member outer part 6A that constitutes a side wall 10 on an outside in a vehicle width direction; an upper member inner part 6B that is joined to an inside in the vehicle width direction of the upper member outer part 6A and constitutes a closed cross-section extending in a vehicle body front-to-rear direction together with the upper member outer part 6A; and a stiffener 6C that is joined to an inside in the vehicle width direction of the side wall 10 of the upper member outer part 6A and reinforces a rear part of the upper member outer part 6A. The stiffener 6C is joined to an inner surface of a rear part of the upper member outer part 6A and constitutes a closed cross-section having a substantially rectangular shape extending in the vehicle body front-to-rear direction together with the upper member outer part 6A in an inner part of the closed cross-section formed of the upper member outer part 6A and the upper member inner part 6B. The stiffener 6C is arranged on a vehicle body frontward side further than a front wall 3Aa of the front pillar 3. A rear end part 6Cr of the stiffener 6C faces a front surface of the front wall 3Aa of the front pillar 3 with a gap.

The side wall 10 of the upper member outer part 6A extends continuously from a front end part toward a rear end part. A pillar fixation part 12 that is overlaid on and fastened and fixed to a side wall 11 on an outside in the vehicle width direction of the front pillar 3 is provided in a rearward extension area 10E at a vehicle body rearward side further than the rear end part of the stiffener 6C.

In the present embodiment, the pillar fixation part 12 is constituted of a bolt fastening hole and a circumferential edge area of the bolt fastening hole. The pillar fixation part 12 is provided at two positions that are spaced apart in a vertical direction from each other close to a rear end part of the rearward extension area 10E.

The rear end part of the rearward extension area 10E (side wall 10) of the upper member outer part 6A includes a first protrusion shape portion 10Ea formed in a circumferential area of the upper pillar fixation part 12, a second protrusion shape portion 10Eb formed in a circumferential area of the lower pillar fixation part 12, and a recess shape portion 10Ec formed between the first protrusion shape portion 10Ea and the second protrusion shape portion 10Eb. The first protrusion shape portion 10Ea and the second protrusion shape portion 10Eb protrude in a mountain shape toward a vehicle body rearward side. The recess shape part 10Ec is curved and recessed toward the vehicle body rearward side between the first protrusion shape portion 10Ea and the second protrusion shape portion 10Eb.

A bead shape part 13 that convexly projects outward in the vehicle width direction is formed on a rear part of the side wall 10 of the upper member outer part 6A. The bead shape part 13 extends to a position close to the pillar fixation part 12 from a vehicle body frontward position further than the rear end part of the stiffener 6C joined to the inner surface of the side wall 10. The bead shape part 13 is formed in a substantially U shape directed in a lateral direction in a front view (vehicle body side view).

Figure 7:
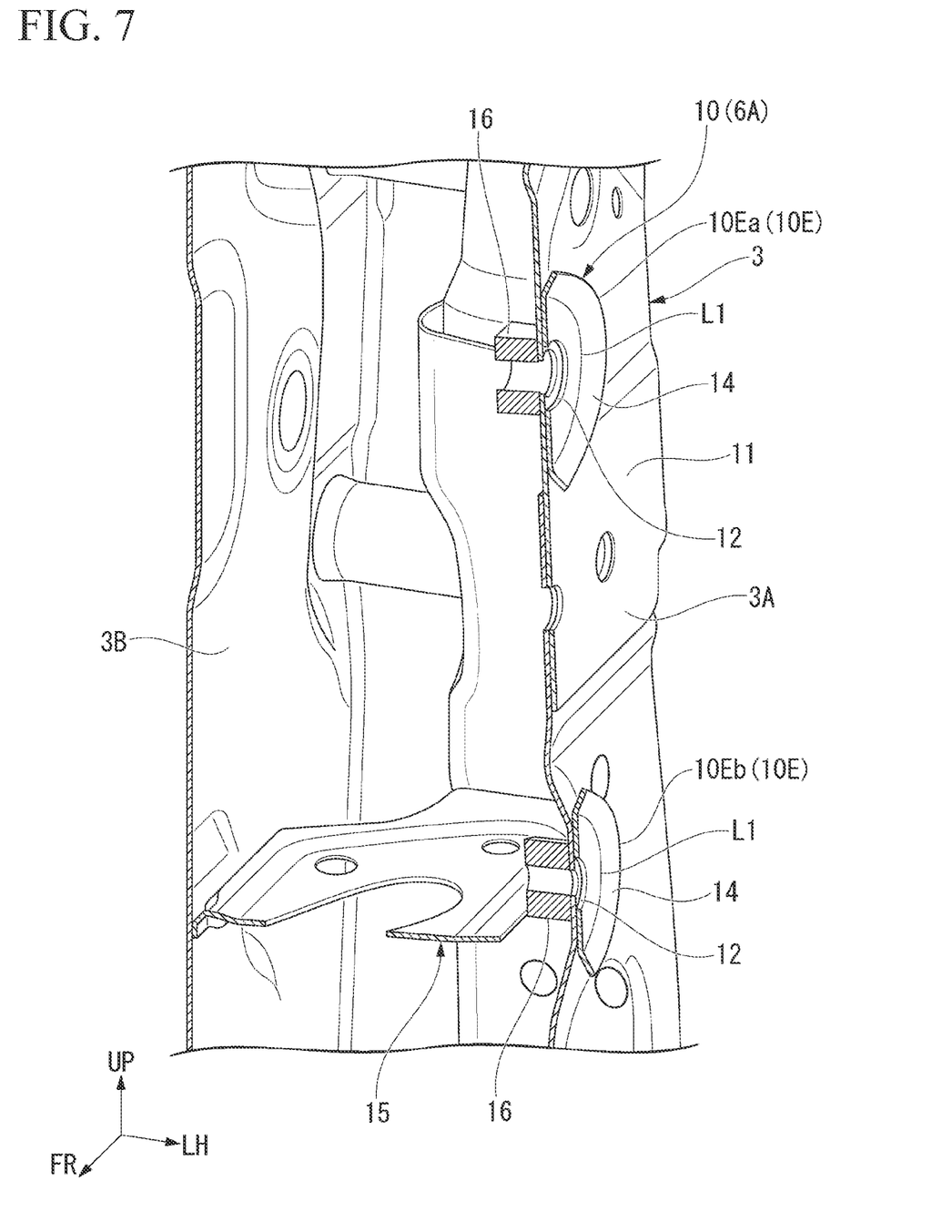
FIG. 7 is a partial cross-sectional perspective view of the vehicle in which a part corresponding to a VII-VII cross-section of FIG. 2 is sectioned.

FIG. 7 is a partial cross-sectional perspective view in which a part corresponding to a VII-VII cross-section of FIG. 2 is sectioned.

As shown in FIG. 2 and FIG. 7, a circumference edge bend part 14 that is bent at a small angle outward in the vehicle width direction is formed on circumference edge sections (circumference edge portions of the pillar fixation part 12) of the first protrusion shape portion 10Ea and the second protrusion shape portion 10Eb at a rear end of the rearward extension area 10E. A ridge line L1 substantially along circumference edge shapes of the first protrusion shape portion 10Ea and the second protrusion shape portion 10Eb is formed on a root portion of the circumference edge bend part 14.

Figure 8:
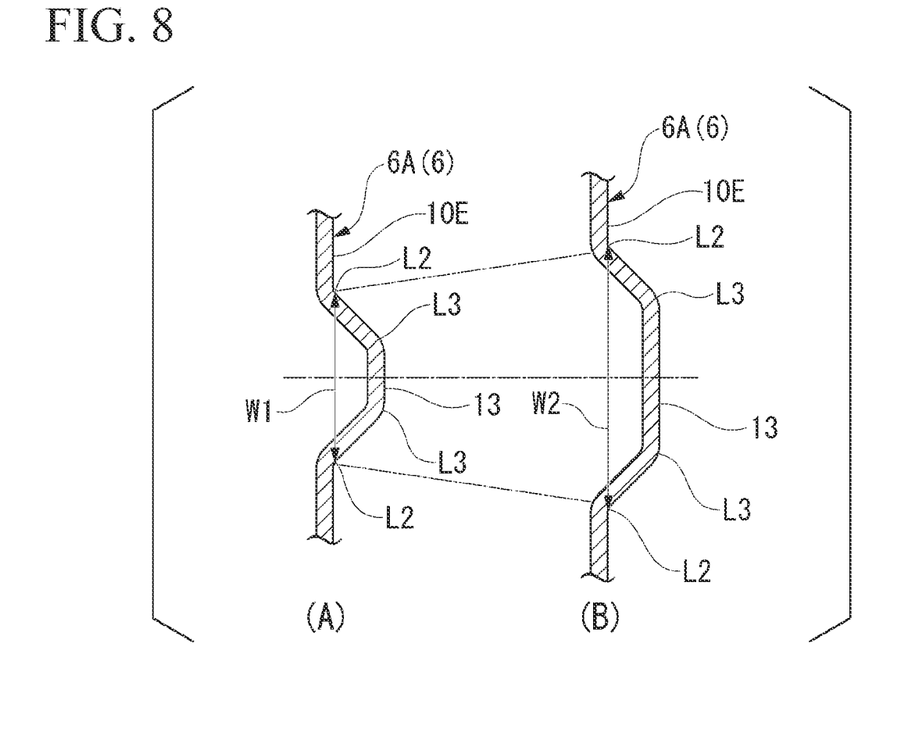
FIG. 8 is a view showing a cross-sectional view along a VIIIA-VIIIA line of FIG. 2 and a cross-sectional view along a VIIIB-VIIIB line.

Sections (A) and (B) of FIG. 8 show a cross-sectional view along a VIIIA-VIIIA line of FIG. 2 and a cross-sectional view along a VIIIB-VIIIB line, respectively.

As shown in FIG. 2 and FIG. 8, the bead shape part 13 of the side wall 10 has a vertical cross-section formed in a substantially trapezoidal shape, and a portion that becomes a top surface of the trapezoidal shape defines a flat surface. Thereby, two ridge lines L2 and L3 are formed on a root side and a top side of the bead shape part 13, respectively. Hereinafter, a ridge line on the root side of the bead shape part 13 is referred to as a root-side ridge line L2, and a ridge line on the top side of the bead shape part 13 is referred to as a top-side ridge line L3. As indicated by w1 and w2 in the sections (A) and (B) of FIG. 8, a spacing in the vertical direction between a root-side ridge line L2 which is located on an upper side of the bead shape part 13 and a root-side ridge line L2 which is located on a lower side of the bead shape part 13 is gradually enlarged from a frontward direction toward a rearward direction in a vehicle body front-to-rear direction (w1<w2). Similarly, a spacing between a top-side ridge line L3 which is located on the upper side and a top-side ridge line L3 which is located on the lower side is also gradually enlarged from the frontward direction toward the rearward direction in the vehicle body front-to-rear direction.

The root-side ridge line L2 on the upper side of the bead shape part 13 continues to the ridge line L1 of the circumference edge bend part 14 of the first protrusion shape portion 10Ea. The root-side ridge line L2 on the lower side of the bead shape part 13 continues to the ridge line L1 of the circumference edge bend part 14 of the second protrusion shape portion 10Eb.

Figure 9:
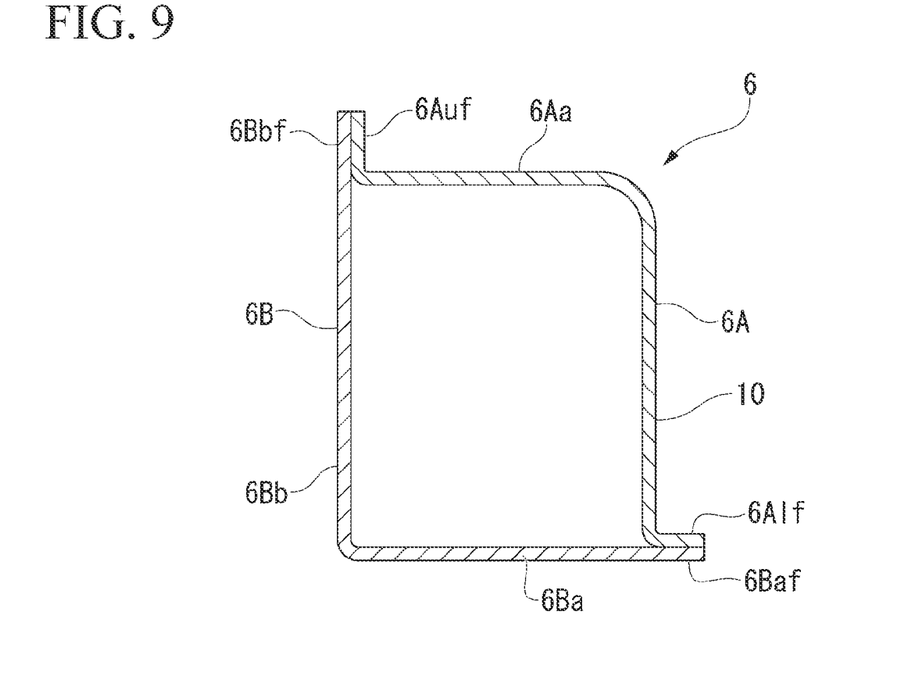
FIG. 9 is a cross-sectional view along a IX-IX line of FIG. 3.
Figure 10:
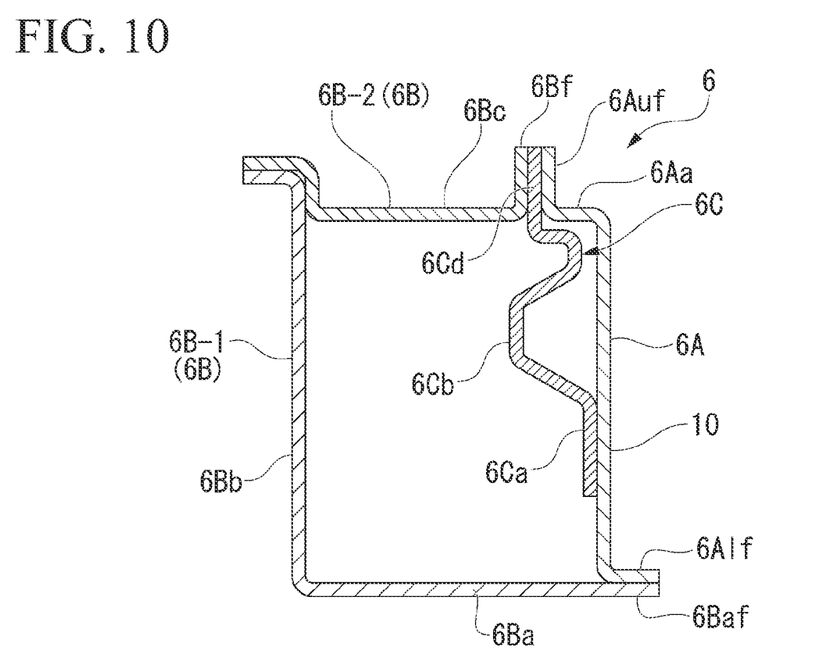
FIG. 10 is a cross-sectional view along a X-X line of FIG. 3.

FIG. 9 is a cross-sectional view along a IX-IX line of FIG. 3. FIG. 10 is a cross-sectional view along a X-X line of FIG. 3, and FIG. 11 is a cross-sectional view along a XI-XI line of FIG. 3.

As shown in FIG. 9, the upper member inner part 6B is formed such that a cross-section in a front-side area has a substantially L shape. That is, the front-side area of the upper member inner part 6B includes a lower wall 6Ba that extends substantially horizontally in the vehicle width direction and a side wall 6Bb on the inner side in the vehicle width direction that is bent and extends upward from an end part on the inside in the vehicle width direction of the lower wall 6B a. An end edge on the outside in the vehicle width direction of the lower wall 6Ba is defined as an inner lower flange 6Baf that is joined to the upper member outer part 6A. An end edge on the upper side of the side wall 6Bb is defined as an inner upper flange 6Bbf that is joined to the upper member outer part 6A.

Figure 11:
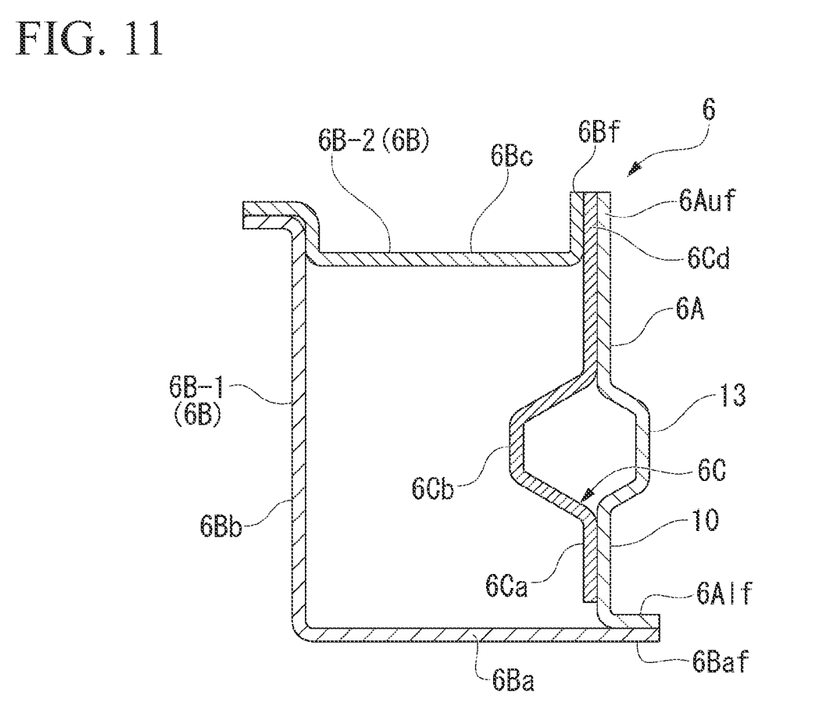
FIG. 11 is a cross-sectional view along a XI-XI line of FIG. 3.

As shown in FIG. 10 and FIG. 11, in an area from an intermediate area to a rear-side area of the upper member inner part 6B, an upper wall panel 6B-2 as a separate body is joined integrally to an upper part of the side wall 6Bb of a main body panel 6B-1 having a substantially L-shaped cross-section which is the same as that of the front-side area. The upper wall panel 6B-2 includes: an upper wall 6Bc that extends substantially horizontally outward in the vehicle width direction from a joint part with the side wall 6Bb of the main body panel 6B-1; and an inner upper flange 6Bf that stands upward from an outer end part in the vehicle width direction of the upper wall 6Bc. As shown in FIG. 5, the inner upper flange 6Bf of the upper wall panel 6B-2 includes a tilt area Ia in which a standing position continuously changes from an inside to an outside in a vehicle width direction toward a vehicle body rearward direction from a vehicle body frontward direction. A rear part of the inner upper flange 6Bf of the upper wall panel 6B-2 further than the tilt area Ia forms a rear extension region Ra in which a standing position does not change in the vehicle width direction. In the inner upper flange 6Bf, a bend part b is formed between the tilt area Ia and the rear extension region Ra.

As shown in FIG. 9, the upper member outer part 6A is formed such that a cross-section in a front-side area has a substantially L shape. That is, the front-side area of the upper member outer part 6A includes the side wall 10 on the outside in the vehicle width direction that extends in a vertical direction and an upper wall 6Aa that is bent and extends inward in the vehicle width direction from an upper end part of the side wall 10. An outer lower flange 6Alf that is bent outward in the vehicle width direction is provided on a lower end part of the side wall 10, and an outer upper flange 6Auf that is bent in a vehicle body upward direction is provided on an inner end part in the vehicle width direction of the upper wall 6Aa. In the front-side area, the outer lower flange 6Alf is joined to the inner lower flange 6Baf of the upper member inner part 6B, and the outer upper flange 6Auf is joined to the inner upper flange 6Bbf of the upper member inner part 6B.

As shown in FIG. 11, in the rear-side area of the upper member outer part 6A, an upper part of the side wall 10 extends upward approximately straight, and the part is defined as the outer upper flange 6Auf. As shown in FIG. 5, the outer upper flange 6Auf in the intermediate area of the upper member outer part 6A includes a tilt area Ia in which a standing position continuously changes from an inside to an outside in a vehicle width direction toward a vehicle body rearward direction from a vehicle body frontward direction. A rear part of the outer upper flange 6Auf further than the tilt area Ia forms a rear extension region Ra in which a standing position does not change in the vehicle width direction. In the outer upper flange 6Auf, a bend part b is formed between the tilt area Ia and the rear extension region Ra.

As shown in FIG. 5, the stiffener 6C includes: a base wall 6Ca that extends along an inner surface of the sidewall 10 of the upper member outer part 6A; a projection part 6Cb that projects inward in the vehicle width direction from a middle area in the vertical direction of the base wall 6Ca; an upper wall 6Cc that is provided to be bent inward in the vehicle width direction on an upper end part from a middle area in the vehicle body front-to-rear direction to a front area of the base wall 6Ca; and a joint piece 6Cd that stands upward from part of an upper end of the base wall 6Ca and the upper wall 6Cc. The base wall 6Ca is joined to the inner surface of the side wall 10 of the upper member outer part 6A, and thereby, the stiffener 6C forms a closed cross-section along the vehicle body front-to-rear direction with the upper member outer part 6A. The joint piece 6Cd is provided between the tilt areas Ia of the inner upper flange 6Bf of the upper member inner part 6B and the outer upper flange 6Auf of the upper member outer part 6A and is jointed to the inner upper flange 6Bf and the outer upper flange 6Auf in that state. More precisely, the joint piece 6Cd is joined to the tilt areas Ia of the inner upper flange 6Bf and the outer upper flange 6Auf and the rear extension region Ra so as to interpose the bend part b.

Figure 12:
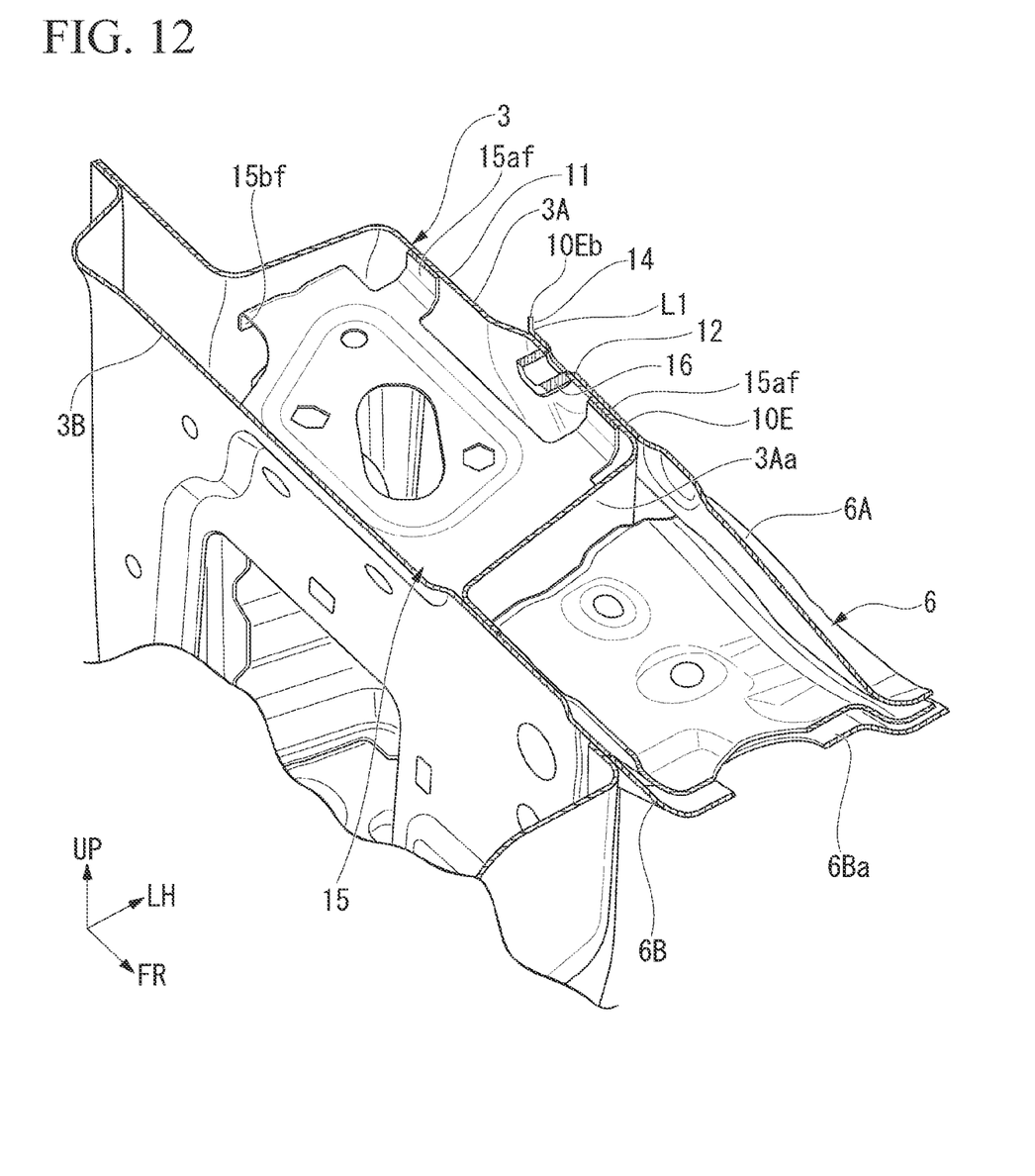
FIG. 12 is a partial cross-sectional perspective view of the vehicle in which a part corresponding to a XII-XII cross-section of FIG. 2 is sectioned.

FIG. 12 is a partial cross-sectional perspective view of a joint part between the front pillar 3 and the upper member 6 in which a part corresponding to a XII-XII cross-section of FIG. 2 is sectioned.

As shown in FIG. 7 and FIG. 12, the front pillar 3 includes: a pillar inner part 3B that is arranged on an inside in the vehicle width direction; and a pillar outer part 3A that is joined to an outside in the vehicle width direction of the pillar inner part 3B. The front pillar 3 constitutes a closed cross-section having a substantially rectangular shape that is continuous in the vehicle body vertical direction by the pillar inner part 3B and the pillar outer part 3A. A bulk head 15 of which a main wall extends substantially horizontally (in a direction that crosses an extension direction of the closed section of the front pillar 3) is joined to an inner part of the closed section of the front pillar 3. The bulk head 15 is arranged at a position that crosses the ridge line L1 of the circumference edge bend part 14 of the sidewall 10 of the upper member outer part 6A in the inner part of the closed cross-section of the front pillar 3. In the present embodiment, the bulk head 15 is arranged at a position that crosses the ridge line L1 of the circumference edge bend part 14 of the second protrusion shape portion 10Eb.

The bulk head 15 includes a plurality of connection flanges 15af and 15bf used for being joined to the inner surface of the front pillar 3. Two connection flanges 15af of the plurality of connection flanges 15af and 15bf are connected to a rear surface of the side wall 11 of the pillar outer part 3A. A weld nut 16 (fixed part) to which the pillar fixation part 12 of the side wall 10 of the upper member outer part 6A is fastened and fixed is fixed to the rear surface of the side wall 11 of pillar outer part 3A. The weld nut 16 (fixed part) to which the pillar fixation part 12 on the lower side of the sidewall 10 is fastened and fixed is arranged between the two connection flanges 15af of the bulk head 15. Each of connection parts of the two connection flanges 15af are arranged at a position at substantially the same height as the weld nut 16 (fixed part).

In the case of the present embodiment, as shown in FIG. 12, the bulk head 15 is arranged at a vertical position that is aligned in the vehicle body front-to-rear direction with the lower wall 6Ba at a rear part of the upper member 6. The bulk head 15 may be arranged at a vertical position that is aligned in the vehicle body front-to-rear direction with the upper wall 6Bc at a rear part of the upper member 6.

As shown in FIG. 4, the pillar inner part 3B includes a front extension part 3Be that extends in a vehicle body frontward side further than the pillar outer part 3A from a joint part on the vehicle body frontward side with the pillar outer part 3A. A rear part of the inner side wall 6Bb in the vehicle width direction of the upper member inner part 6B is joined to a front extension part 3Be of the pillar inner part 3B.

Figure 13:
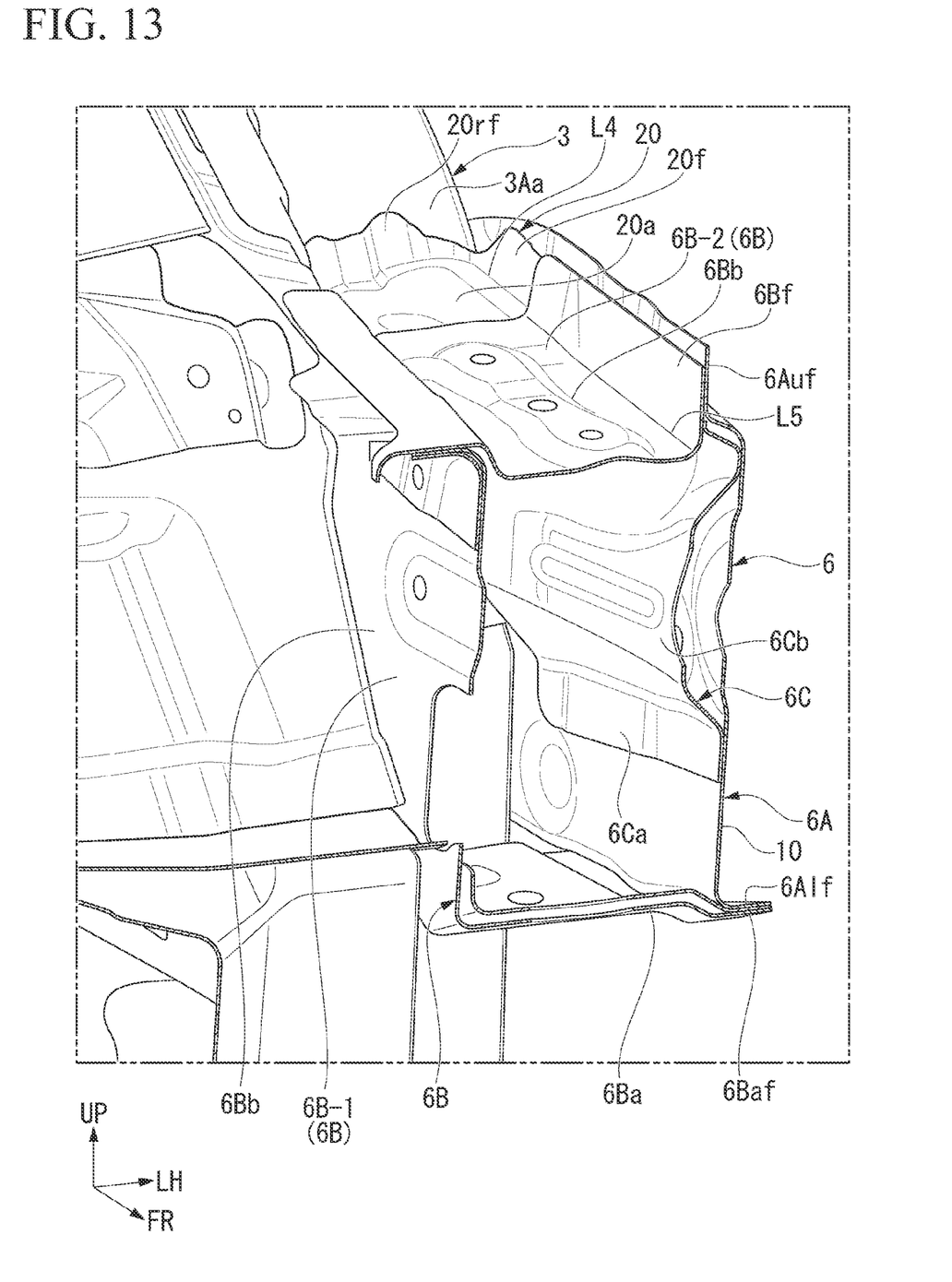
FIG. 13 is a partial cross-sectional perspective view of the vehicle in which a part corresponding to a XIII-XIII cross-section of FIG. 2 is sectioned.

As shown in FIG. 4 and FIG. 13, the upper wall 6Bc and the inner upper flange 6Bf of the upper member inner part 6B of the upper member 6 is joined to the front wall 3Aa of the pillar outer part 3A via a patch member 20. The patch member 20 includes: a patch top wall 20a that is connected to the upper wall 6Bc of the upper member inner part 6B; a patch flange 20f that is connected to the inner upper flange 6Bf of the upper member inner part 6B; and a rear flange 20rf that is connected to the front wall 3Aa of the pillar outer part 3A. A bend ridge line L4 between the patch flange 20f and the patch upper wall 20a of the patch member 20 continues in the vehicle body front-to-rear direction to a bend ridge line L5 between the inner upper flange 6Bf and the upper wall 6Bc of the upper member inner part 6B.

In the configuration described above, when an impact load is input to a front part of the upper member 6 of the vehicle 1, a rear part of the upper member 6 collapses and deforms, and the rear end part 6Cr of the stiffener 6C of the upper member 6 comes into contact with the front wall 3Aa of the front pillar 3. Thereby, the impact load input to the upper member 6 is transmitted through the front pillar 3 to the vehicle body rear. At this time, since in the side wall 10 of the upper member 6, the bead shape part 13 that convexly projects outward in the vehicle width direction extends from a further frontward position than the rear end part 6Cr of the stiffener 6C to the vicinity of the pillar fixation part 12 in the rearward extension area 10E, the rearward extension area 10E of the side wall 10 is prevented from falling and deforming outward in the vehicle width direction. Accordingly, in a case where the vehicle body front part structure of the present embodiment is employed, when an impact load is input from the vehicle body frontward direction, it is possible to prevent the upper member 6 from falling outward in the vehicle width direction, and it is possible to efficiently transmit the impact load to the front pillar 3.

Further, in the present embodiment, since the bead shape part 13 of the side wall 10 of the upper member 6 convexly projects outward in the vehicle width direction, it is possible to enlarge a cross-sectional area of the closed cross-section formed of the upper member 6 and the stiffener 6C. Therefore, when the present configuration is employed, the input load from the vehicle frontward direction can be stably transmitted to the front pillar 3.

Further, in the vehicle body front part structure of the present embodiment, the circumference edge bend part 14 that is bent outward in the vehicle width direction is formed on the circumference edge portion of the pillar fixation part 12 in the rearward extension area 10E of the side wall 10, and the ridge line L1 on the root of the circumference edge bend part 14 continues to the root-side ridge line L2 of the bead shape part 13. Therefore, it is possible to efficiently enhance the stiffness of the side wall 10 from the bead shape part 13 to the circumference edge portion of the pillar fixation part 12. Accordingly, in a case where the present embodiment is employed, when an impact load is input from the vehicle body frontward direction, it is possible to further prevent the falling deformation of the rearward extension area 10E of the upper member 6, and it is possible to efficiently transmit the impact load to the vehicle body rearward direction through the rearward extension area 10E of the upper member 6.

Further, in the present embodiment, since the bead shape part 13 of the side wall 10 is formed in a vertical cross-sectional shape having a substantially trapezoidal shape, and a part that becomes the top surface of the trapezoidal is a flat surface, it is possible to form the top-side ridge line L3 not only on the root of the bead shape part 13 but also on the part corresponding to the top of the trapezoidal shape. Therefore, in a case where the present configuration is employed, an impact load input to the upper member 6 from the vehicle body frontward direction can be further efficiently transmitted to the vehicle body rearward direction.

Further, in the present embodiment, the spacing between the root-side ridge line L2 on the upper side of the bead shape part 13 and the root-side ridge line L2 on the lower side is increased toward a rearward direction from a frontward direction in the vehicle body front-to-rear direction. Therefore, when the present configuration is employed, the load input to the bead shape part 13 of the side wall 10 from the vehicle body frontward direction can be easily distributed and transmitted to a wide range in the vertical direction of the front pillar 3.

Further, in the vehicle body front part structure of the present embodiment, the bulk head 15 that is joined to the inside of the front pillar 3 is arranged at a position that intersects the ridge line L1 of the circumferential edge of the pillar fixation part 12 on the rear side of the upper member 6. Therefore, an impact load that is input to the upper member 6 from the vehicle body frontward direction can be efficiently transmitted to a reinforcement portion by the bulk head 15 of the front pillar 3. Accordingly, when the present configuration is employed, the impact load transmitted to the rearward extension area 10E of the upper member 6 can be further efficiently transmitted to the vehicle body rearward direction.

Further, in the vehicle body front part structure of the present embodiment, the connection part of the connection flange 15*af* of the bulk head 15 is arranged at a position at substantially the same height as the fixation part (fixed part) of the weld nut 16 used for fixing the rearward extension area 10E of the upper member 6. Therefore, when the present configuration is employed, the impact load input to the upper member 6 from the vehicle body frontward direction can be efficiently transmitted from the pillar fixation part 12 to a highly rigid part of the front pillar 3 at substantially the same height as the direct reinforcement part (connection flange 15*af*) by the bulk head 15.

Further, in the present embodiment, since the bulk head 15 is arranged at a vertical position aligned in the vehicle body front-to-rear direction with the lower wall 6Ba on the rear part of the upper member 6, the load transmitted from the vehicle body frontward direction to the lower wall 6Ba on the rear part of the upper member 6 can be stably received by the bulk head inside the front pillar 3.

Further, in the vehicle body front part structure of the present embodiment, the joint piece 6Cd of the stiffener 6C is provided between the tilt areas Ia of the inner upper flange 6Bbf of the upper member inner part 6B and the outer upper flange 6Auf of the upper member outer part 6A and is joined to the inner upper flange 6Bbf and the outer upper flange 6Auf. Therefore, an impact load that is transmitted through the outer corner portion of the upper member outer part 6A to the joint part of the inner upper flange 6Bbf and the outer upper flange 6Auf can be efficiently transmitted to the upper wall 6Bc of the upper member inner part 6B via the joint piece 6Cd of the stiffener 6C provided between the tilt areas Ia. As a result, it is possible to reduce the load transmitted to the pillar fixation part 12 at the rear part of the side wall 10 on the outside in the vehicle width direction of the upper member 6. Accordingly, when the present configuration is employed, it is possible to further prevent the upper member 6 from falling outward in the vehicle width direction when the impact load is input from the vehicle body frontward direction.

Further, in the vehicle body front part structure of the present embodiment, the joint piece 6Cd of the stiffener 6C is joined to the rear extension region Ra and the tilt areas Ia of the upper member inner part 6B and the upper member outer part 6A so as to interpose the bend part. Therefore, an impact load transmitted from a vehicle frontward direction to the tilt area Ia of the outer upper flange 6Auf can be also efficiently transmitted to the rear tilt area Ra and the bend part b of the inner upper flange 6Bf via the joint piece 6Cd of the stiffener 6C. Accordingly, when the present configuration is employed, it is possible to increase the load transmitted to the upper wall 6Bc of the upper member inner part 6B.

Further, in the vehicle body front part structure of the present embodiment, the rear part of the side wall 6Bb on the inside in the vehicle width direction of the upper member inner part 6B is joined to the front extension part 3Be provided on the pillar inner part 3B. Therefore, an impact load transmitted from a vehicle frontward direction to the side wall 6Bb on the inside in the vehicle width direction of the upper member inner part 6B can be transmitted to the closed cross-section of the front pillar 3 via the front extension part 3Be of the pillar inner part 3B. Accordingly, in a case where the present configuration is employed, the impact load that is input from the vehicle body frontward direction to the upper member 6 can be transmitted to the front pillar 3 through a wide area of the rear part of the upper member 6.

Further, in the vehicle body front part structure of the present embodiment, the upper wall 6Bc of the upper member inner part 6B and the inner upper flange 6Bf of the upper member inner part 6B are joined to the front wall 3Aa of the pillar outer part 3A via the patch member 20, and the bend ridge line L4 between the patch flange 20*f* and the patch upper wall 20*a* of the patch member 20 continue in the vehicle body front-to-rear direction to the bend ridge line L5 between the inner upper flange 6Bf and the upper wall 6Bc of the upper member inner part 6B. Therefore, an impact load transmitted from the vehicle frontward direction to the inner upper flange 6Bf or the upper wall 6Bc of the upper member inner part 6B can be efficiently transmitted to the front wall 3Aa of the front pillar 3 through the bend ridge line L4 of the patch member 20 and the bend ridge line L5 of the upper member inner part 6B. Accordingly, in a case where the present configuration is employed, it is possible to further prevent the upper member 6 from falling outward in the vehicle width direction when an impact load is input.

The present invention is not limited to the embodiment described above, and various design changes can be made without departing from the scope of the invention.

For example, the pillar fixation part 12 may be joined not only by a bolt but also by a rivet, an adhesive, welding, or the like.

What is claimed is:

1. A vehicle body front part structure, comprising:
    a front pillar that forms a closed cross-section extending in a vehicle body vertical direction; and
    an upper member that extends from the front pillar to a vehicle body frontward direction,
    wherein the upper member comprises:
        a side wall on an outside in a vehicle width direction; and
        a stiffener that is joined to an inner surface of the side wall, that has a rear end part facing a front surface of the front pillar, and that forms a closed cross-section extending substantially in a vehicle body front-to-rear direction together with the side wall,
    the side wall of the upper member comprises:
        a pillar fixation part that is arranged in a rearward extension area extending in a vehicle body rearward direction further than the rear end part of the stiffener and that is fixed to a side wall on an outside in the vehicle width direction of the front pillar; and
        a bead shape part that convexly projects outward in the vehicle width direction and that extends to a vicinity of the pillar fixation part from a frontward position further than the rear end part of the stiffener,
    a circumference edge bend part that is bent outward in the vehicle width direction is formed on a circumference edge portion of the pillar fixation part in the rearward extension area, and
    a ridge line on a root of the circumference edge bend part continues to a ridge line on a root of the bead shape part.

2. The vehicle body front part structure according to claim 1,
    wherein the bead shape part has a vertical cross-section formed in a substantially trapezoidal shape, and part of the bead shape part that is a top surface of the trapezoidal shape is a flat surface.

3. The vehicle body front part structure according to claim 1,
    wherein a ridge line is formed on each of root positions of an upper side portion and a lower side portion of the bead shape part, and
    a spacing between the ridge lines of the upper side portion and the lower side portion is increased toward a rearward direction from a frontward direction in a vehicle body front-to-rear direction.

4. The vehicle body front part structure according to claim 1,
    wherein the front pillar has an inner portion of the closed cross-section that extends in a vehicle body vertical direction to which a bulk head that extends in a direction intersecting an extension direction of the closed cross-section is joined, and
    the bulk head is arranged at a position that intersects the ridge line on the root of the circumference edge bend part in the rearward extension area.

5. The vehicle body front part structure according to claim 4,
    wherein the bulk head includes a connection flange joined to the sidewall of the front pillar, and
    a connection part of the connection flange is arranged at a position at substantially the same height as a fixed part of the front pillar to which the pillar fixation part is fixed.

6. The vehicle body front part structure according to claim 4,
    wherein the bulk head is arranged at a vertical position aligned in the vehicle body front-to-rear direction with a lower wall of a rear part of the upper member.

7. A vehicle body front part structure, comprising:
    a front pillar that forms a closed cross-section extending in a vehicle body vertical direction; and
    an upper member that extends from the front pillar to a vehicle body frontward direction,
    wherein the upper member comprises:
        a side wall on an outside in a vehicle width direction; and
        a stiffener that is joined to an inner surface of the side wall, that has a rear end part facing a front surface of the front pillar, and that forms a closed cross-section extending substantially in a vehicle body front-to-rear direction together with the side wall,
    the side wall of the upper member comprises:
        a pillar fixation part that is arranged in a rearward extension area extending in a vehicle body rearward direction further than the rear end part of the stiffener and that is fixed to a side wall on an outside in the vehicle width direction of the front pillar; and
        a bead shape part that convexly projects outward in the vehicle width direction and that extends to a vicinity of the pillar fixation part from a frontward position further than the rear end part of the stiffener,
    the upper member comprises an upper member inner part and an upper member outer part that are joined together in a vertical direction and that form a closed cross-section extending in a vehicle body front-to-rear direction,
    the upper member inner part and the upper member outer part include an inner upper flange and an outer upper flange that stand upward and that are joined together,
    the inner upper flange and the outer upper flange include a tilt area in which a standing position changes from an inside to an outside in a vehicle width direction toward a vehicle body rearward direction from a vehicle body frontward direction, and
    the stiffener includes a joint piece that is provided between the tilt areas of the inner upper flange and the outer upper flange and that is joined to the inner upper flange and the outer upper flange.

8. The vehicle body front part structure according to claim 7,
    wherein the inner upper flange and the outer upper flange have a rear extension region that is arranged at a rear end of the tilt area and that extends via a bend part to a vehicle body rearward direction, and
    the joint piece of the stiffener is joined to the tilt area and the rear extension region so as to interpose the bend part.

9. The vehicle body front part structure according to claim 7,
wherein the front pillar comprises a pillar inner part and a pillar outer part that are joined together and that form the closed cross-section extending in the vehicle body vertical direction,
the upper member inner part includes a side wall on an inside in the vehicle width direction and an upper wall that is bent outward in the vehicle width direction from an upper part of the side wall and that is connected to the inner upper flange,
the pillar inner part includes a front extension part extending in a vehicle body frontward direction further than the pillar outer part from a joint part on a vehicle body frontward side with the pillar outer part, and
a rear part of the side wall on the inside in the vehicle width direction of the upper member inner part is joined to the front extension part of the pillar inner part.

10. The vehicle body front part structure according to claim 9,
wherein the upper wall of the upper member inner part and the inner upper flange of the upper member inner part are joined to a front wall of the pillar outer part via a patch member,
the patch member includes a patch upper wall joined to the upper wall of the upper member inner part and a patch flange joined to the inner upper flange of the upper member inner part, and
a bend ridge line between the patch flange and the patch upper wall of the patch member continues in the vehicle body front-to-rear direction to a bend ridge line between the inner upper flange and the upper wall of the upper member inner part.

* * * * *